United States Patent [19]

Butschek

[11] 3,883,054
[45] May 13, 1975

[54] APPARATUS FOR INTERCEPTING AND ADVANCING THE LEADERS OF PHOTOGRAPHIC ROLL FILMS

[75] Inventor: Hans Albert Butschek, Ottobrunn, Germany

[73] Assignee: Agfa-Gevaert Aktiengesellschaft, Leverkusen, Germany

[22] Filed: Apr. 8, 1974

[21] Appl. No.: 458,856

[30] Foreign Application Priority Data
Apr. 7, 1973  Germany............................ 2317590

[52] U.S. Cl. ..................... 225/93; 225/103; 242/55
[51] Int. Cl. .......................... B26f 3/00; B65h 75/00
[58] Field of Search ............... 242/55, 65, 66, 67.3; 29/430, 200 D; 225/93, 103

[56] References Cited
UNITED STATES PATENTS

| | | | |
|---|---|---|---|
| 3,377,687 | 4/1968 | Chellis | 29/200 D |
| 3,498,555 | 3/1970 | Leblond et al. | 242/67.3 R X |
| 3,722,055 | 9/1971 | D'Ercole et al. | 225/93 X |
| 3,823,888 | 7/1974 | Zangenfeind et al. | 242/55 |

*Primary Examiner*—John W. Huckert
*Assistant Examiner*—John M. Jillions
*Attorney, Agent, or Firm*—Michael S. Striker

[57] ABSTRACT

Apparatus for intercepting the leader of photographic film which is convoluted on a reel within a convoluted backing strip whose front portion extends beyond the leader of the film has a lever which is pivotable from a first position of engagement with the reel in a cassette to a second position in which the front portion of the backing strip is looped by a rotating friction wheel. The lever carries a tool which breaks open the casing of the cassette in response to movement of the lever from its first position and bears against the backing strip on the withdrawn reel in the second position of the lever so that the friction wheel cannot rotate the reel in a direction to collect the film and backing strip. The looped front portion of the backing strip is caused to enter the nip of two advancing rolls which begin to withdraw the backing strip whereby the backing strip deflects the tool and rotates the reel in a direction to pay out the film. The leader of the film is intercepted by an elastic deflector which introduces the leader into a film channel wherein the leader advances into the nip of two additional advancing rolls serving to transport the film toward a splicing station where the leader is attached to the trailing end of the preceding film. The friction wheel is automatically disengaged from the backing strip when the reel begins to rotate in a direction to pay out the film.

15 Claims, 2 Drawing Figures

3,883,054

APPARATUS FOR INTERCEPTING AND ADVANCING THE LEADERS OF PHOTOGRAPHIC ROLL FILMS

CROSS-REFERENCE TO RELATED APPLICATION

The apparatus of the present invention constitutes an improvement over and a further development of apparatus disclosed in the commonly owned copending application Ser. No. 252,416 filed May 11, 1972 by Helmut Zangenfeind et al., now U.S. Pat. No. 3,823,888 granted July 16, 1974.

BACKGROUND OF THE INVENTION

The present invention relates to improvements in apparatus for intercepting and manipulating the leaders of photographic roll films, and more particularly to improvements in apparatus for intercepting the leaders of photographic roll films which are convoluted on the cores of reels within convoluted backing strips of paper or the like whereby the front portion of the backing strip extends beyond the leader of the film so that the leader becomes accessible in response to unwinding of a certain length of backing strip.

It is already known to rotate a takeup reel for exposed photographic roll film by a friction wheel so as to unwind the backing strip whereby the front portion of the backing strip enters a first channel and the leader of the film is thereupon intercepted by a deflector and introduced into a second channel to be transported to a splicing station where the leader is attached to the trailing portion of the preceding film. Reference may be had to the aforementioned copending application Ser. No. 252,416 of Zangenfeind et al. which discloses an apparatus wherein the entry of front portion of the backing strip into the first channel is detected by a photoelectric monitoring device which thereupon opens the inlet of the second channel for the leader of the film. Such apparatus operate satisfactorily as long as the front portion of the backing strip is not unduly deformed so that it automatically enters the first channel (preferably by gravity) to thus enable the monitoring device to open the second channel. The monitoring device is rather sensitive, the control circuit of the apparatus is rather complex, and the apparatus comprises a substantial number of moving parts.

SUMMARY OF THE INVENTION

An object of the invention is to provide a simple, compact, reliable and inexpensive apparatus for intercepting and advancing the leaders of photographic roll films which are convoluted on the cores of reels or spools within convoluted backing strips whose front portions extend beyond the leaders of the respective films.

Another object of the invention is to provide an apparatus wherein the entry of front portion of the backing strip into a predetermined path need not be monitored by photoelectric detectors or the like and wherein the entry of front portion of the backing strip into such path is not dependent on gravity.

A further object of the invention is to provide an apparatus which, in addition to being capable of intercepting and advancing and/or otherwise manipulating the leaders of photographic roll films which are convoluted on the cores of reels or spools within convoluted backing strips, is also capable of removing the reels from the casings of cassettes or analogous containers for exposed photographic films.

An additional object of the invention is to provide an apparatus which comprises a small number of simple parts, which can intercept the leaders of photographic films on reels or spools for backing strips whose front portions extend beyond the leaders of films by distances of different length, and which can automatically intercept the leaders of films on successive reels which are introduced into the apparatus at regular or irregular intervals, in rapid sequence, and either by hand or by automatic feeding means.

Still another object of the invention is to provide the apparatus with novel and improved means for manipulating the front portions of backing strips and with novel and improved means for manipulating the leaders of photographic films.

The invention is embodied in an apparatus for intercepting and otherwise manipulating the leader of photographic film which is convoluted on a reel or spool within a convoluted backing strip having a front portion which extends beyond the leader of the film. The apparatus comprises a pivotable lever or other suitable means for supporting a reel with convoluted film and backing strip thereon, drive means (preferably including a friction wheel) which is movable into engagement with the front portion of the backing strip on the reel in the supporting means to thereby loop the front portion of the backing strip, means for blocking rotation of the reel in the supporting means at least during engagement of the backing strip with the drive means, means for advancing the looped front portion of the backing strip along a first path and for thereby rotating the reel in a direction to pay out the backing strip so that the leader of the film becomes exposed to rotation of the reel in such direction, and guide means for directing the leader into a second path.

The advancing means for the front portion of the backing strip preferably comprises a pair of rolls at least one of which is driven, and the looped front portion of the backing strip enters the nip of the rolls when the friction wheel rotates in a direction to rotate the reel in the supporting means in a direction to collect the film and while the reel is held against rotation in such direction by the aforementioned blocking means.

The guide means preferably includes an elastic deflector which defines a portion of a channel wherein the leader of the film advances into the nip of a second set of advancing rolls.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
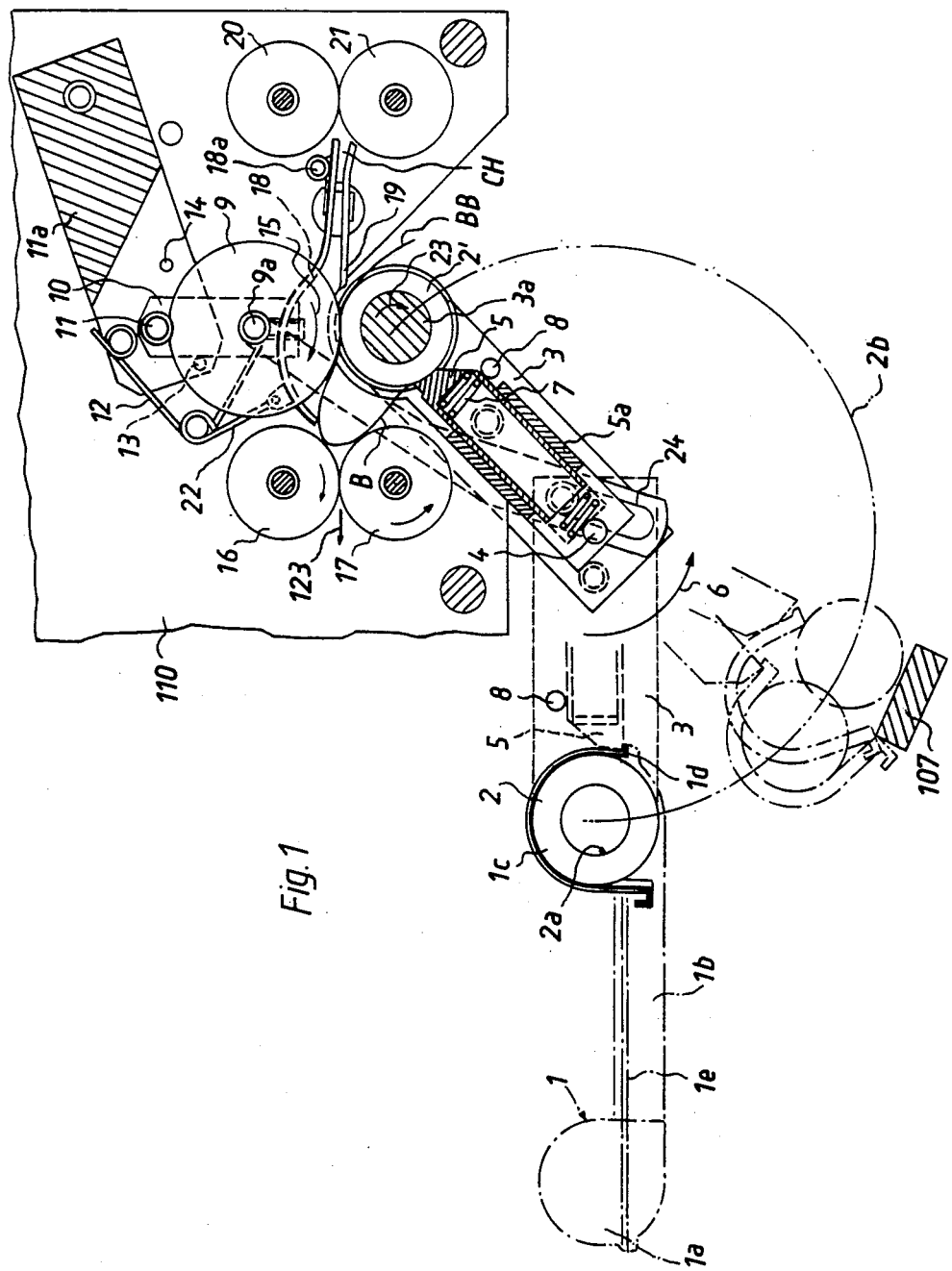
FIG. 1 is a fragmentary schematic partly elevational and partly sectional view of an apparatus which embodies the invention, the supporting means for a takeup reel being shown in two end positions and in several intermediate positions.

The left-hand portion of FIG. 1 shows a cassette or container 1 for exposed photographic film F (FIG. 2) and a backing strip B consisting of paper or the like. The cassette 1 is a so-called drop-in cassette and comprises a substantially semicylindrical supply section 1a, a similar takeup section 1c, and a flat intermediate section 1b provided with a customary window which enables scene light to reach the foremost unexposed film frame when the cassette 1 is properly installed in the body of a camera and the shutter is opened for the purpose of making an exposure. The casing of the cassette 1 is preferably made of suitable synthetic plastic material and is normally assembled of two halves or shells which are welded or otherwise sealingly secured to each other in a plane 1e. The lower shell of the casing of the cassette 1 which is shown in the left-hand portion of FIG. 1 has a projection or shoulder 1d which is located in or close to the plane 1e and extends into the path of a tool 5. This tool is actuated for the purpose of opening the casing of the cassette 1 so as to afford access to and to permit removal of a takeup reel or spool 2 whose core is surrounded by convoluted exposed film F and by convoluted backing strip B. As a rule, the front portion BB of the backing strip B extends well beyond the leader FF of film F on the takeup reel 2 so that the leader FF can be reached only after a certain length of the backing strip has been removed or unwound.

The means for supporting and removing takeup reels 2 from the casings of successive cassettes 1 comprises a pivotable lever 3 which can turn on or with a pivot pin 4 and has two coaxial shiftable trunnions or stubs 3a adapted to enter customary openings 2a in the ends of the takeup reel 2. These openings are accessible even while the reel 2 is still confined in the casing of the respective cassette 1 since they normally receive the output element of a drive which is provided in the camera to rotate the takeup reel during transport of film by the length of a frame so as to place the foremost unexposed frame into register with the aforementioned window of the intermediate section 1b of a cassette 1 in the camera. The lever 3 cooperates with the aforementioned tool 5 in such a way that, when the trunnions 3a of the lever 3 extend into the openings 2a of the takeup reel 2 in a fresh cassette 1 and the tool 5 abuts against the projection 1d of the respective casing, a pivoting of the lever 3 and tool 5 in the direction indicated by arrow 6 will cause the tool 5 to break open the casing by moving its lower shell away from the upper shell while the stubs 3a entrain the reel 2 to move it to the position 2' of FIG. 1. The upper shell of the casing of the cassette 1 shown in FIG. 1 is held by suitable clamping or gripping instrumentalities so that it cannot share the movement of the projection 1d and lower shell. In the event that the lower shell of the casing does not become fully detached from the clamped upper section and continues to move with the reel 2 along the arcuate path 2b shown in FIG. 1, it strikes against a fixedly mounted stop 107 so as to become detached and to drop into a suitable collecting receptacle or onto a conveyor, not shown. The tool 5 is pivotably mounted so that it can yield to and bypass the stop 107 on its way toward the position shown in FIG. 1 by solid lines.

The reel 2 in the right-hand portion of FIG. 1 assumes a film-removing or unwinding position 2' in which it is relieved of the backing strip B as well as of the film F whereby the backing strip advances along a first path (substantially in a direction to the left, as viewed in FIG. 1) and the film F advances along a second path (substantially in a direction to the right, as viewed in FIG. 1). When the tool 5 reaches the solid line position of FIG. 1, it is biased by a helical spring 7 so that it bears against the outermost convolution of backing strip B on the core of the reel 2 in the position 2'. The bias of the spring 7 upon the tool 5 is sufficient to insure that the reel 2 can be rotated only in response to overcoming a substantial resistance. The tool 5 is reciprocable in a sheath 5a and is biased by the spring 7 in a direction away from the axis of the fixed pivot pin 4 for the lever 3. The sheath 5a can turn about the pivot pin 4 so that, when the front portion BB of the backing strip B is pulled in the direction indicated by arrow 123, the tip of the tool 5 can be disengaged from the outermost convolution of backing strip on the core of the reel 2 (in the position 2') as a result of counterclockwise pivoting of the sheath 5a about the pin 4. The tool 5 cannot turn clockwise with respect to the lever 3 because the latter carries a pin-shaped abutment 8 which can be engaged by the exposed outer portion or tip of the tool 5. It will be noted that the abutment 8 urges the tool 5 against the projection 1d of the casing of the cassette 1 shown in the left-hand portion of FIG. 1 when the lever 3 is pivoted counterclockwise to move a fresh reel 2 from the interior of such cassette toward the position 2'.

The reel 2 which assumes the position 2' is engaged by a friction wheel 9 which preferably consists or includes an outer layer of rubber, elastomeric synthetic plastic material or another substances having a high coefficient of friction. The friction wheel 9 is rotatable on a shaft 9a which is mounted at the free end of a link-shaped carrier 10. This carrier is pivotably secured to a preferably stationary holder 11a by a pin 11 which is parallel to the shaft 9a. The extent to which the carrier 10 can move beyond the position of FIG. 1 is limited by two posts 13, 14 of the holder 11a. The holder 11a is rigid with a stationary frame 110 or is pivotable with respect to such frame against the opposition of a relatively strong spring, not shown.

Figure 2:
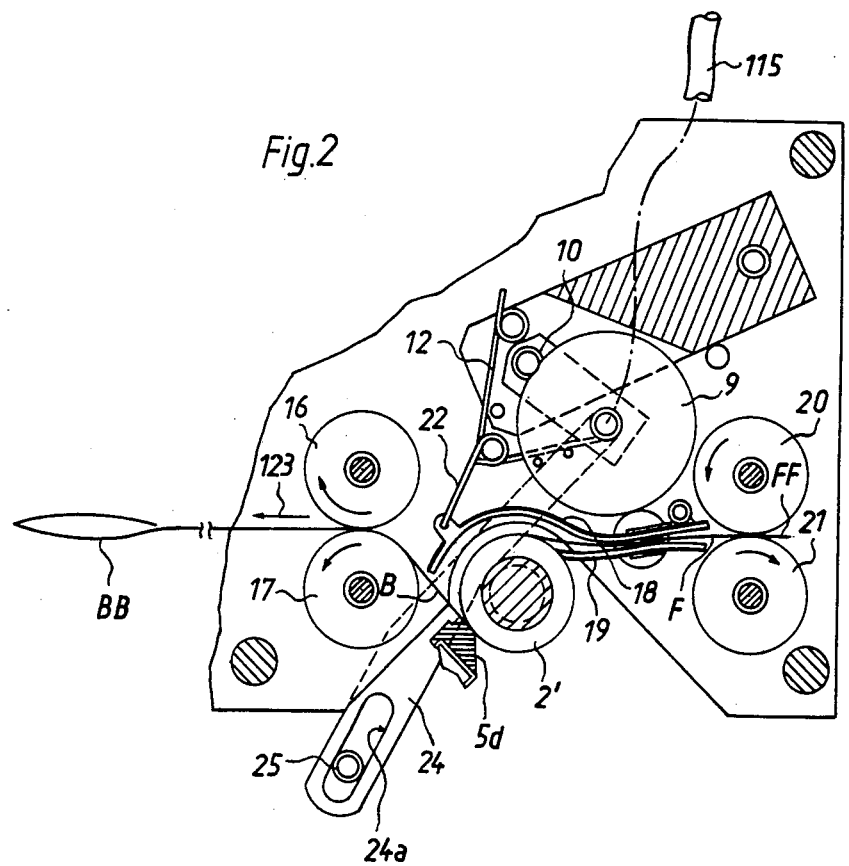
FIG. 2 illustrates a portion of the structure shown in FIG. 1 but with the drive means disengaged from the reel which is held by the supporting means.

The means for biasing the carrier 10 counterclockwise, as viewed in FIG. 1, comprises a torsion spring 12 which can snap over or move beyond a dead-center position when it is deformed to move its coiled central portion from the position of FIG. 1 toward the end position of FIG. 2. In FIG. 2, the carrier 10 abuts against the post 14 of the holder 10a. In the absence of a reel 2 in the position 2', the carrier 10 invariably assumes the other of its two end positions which are determined by the post 13. The spring 12 opposes the movement of the carrier 10 from either end position. When a reel 2 assumes the position 2' of FIG. 1, the spring 12 biases the friction wheel 9 against the front portion BB of the backing strip B. In FIG. 2, the friction wheel 9 is disengaged from the convoluted material on the core of the reel 2 in the position 2' because the carrier 10 abuts against the post 14. The drive means for the reel 2 in the position 2' further comprises means for rotating the friction wheel 9 in the direction indicated by an arrow 15, and such rotating means comprises a suitable prime mover which transmits to the wheel 9 torque through the medium of a flexible shaft 115. It will be noted that, when the friction wheel 9 dwells in the operative position of FIG. 1, it tends to rotate the reel 2 (in the position 2') in a direction (counterclockwise) to collect the film F and backing strip B. Such rotation of the reel 2 is prevented by the blocking means, i.e., by the tool 5.

The means for withdrawing the backing strip B comprises two driven advancing rolls 16, 17 which rotate in directions indicated by arrows so that, when the front portion BB of backing strip B enters the nip of the rolls 16, 17, it is being withdrawn from the reel 2 (in the position 2') by rotating the reel in a clockwise direction (arrow 23).

The leader FF of the film F is caused to enter a channel CH which is defined in part by a suitably curved sheet metal guide 18 (pivotable in the frame 110 at 18a) and having an arcuate portion which overlies with clearance the upper part of the reel 2 in the position 2'. The underside of the channel CH is bounded by a deflector 19 which abuts against the outermost convolution of the backing strip B so as to intercept the oncoming leader FF of the film F and to direct the leader FF into the channel CH. The leader FF advances into the nip of a pair of driven advancing rolls 20, 21 which transport the film F toward a splicing station, not shown, where the leader FF is attached (for example, by an adhesive-coated uniting band or by a rolled splice) to the trailing end of the preceding film so that successive films form an elongated web which is transported through a developing station and thereupon through a copying station in a manner not forming part of the present invention. The deflector 19 is preferably elastic and is mounted in such a way that it causes its tip to bear against the backing strip B of the reel 2 in the position 2' with a certain force which insures that the leader FF of the film F is invariably caused to enter the channel CH and to advance into the nip of the rolls 20, 21. The peripheral speed of the rolls 20, 21 preferably equals the speed of the rolls 16, 17 so that the film F is withdrawn at the speed of the backing strip B.

The free left-hand end portion of the guide 18 is coupled to the coiled central portion of the leaf spring 12 by an elastic or rigid link 22. The guide 18 preferably also consists of an elastic material, such as spring steel. The link 22 causes the guide 18 to move nearer to the reel 2 (in the position 2') when the friction wheel 9 assumes the end position of FIG. 2.

The operation is as follows:

A fresh cassette 1 is fixedly mounted in a position as shown in the left-hand portion of FIG. 1. The lever 3 is thereupon moved to the broken-line position of FIG. 1 and its stubs 3a are caused to enter the respective openings 2a in the takeup reel 2 of the cassette 1. To this end, the stubs 3a are movable axially between retracted positions which they assume during movement into register with the openings 2a and extended positions to thereby enter the registering openings 2a and to thus couple the reel 2 with the lever 3.

The lever 3 is thereupon pivoted (arrow 6) toward the solid-line position of FIG. 1 whereby the tip of the tool 5 displaces the projection 1d so that the lower shell of the casing of the cassette 1 is broken or torn away from the fixedly help upper shell. If the lower shell does not become completely separated from the upper shell, it is bent or otherwise deformed to assume a position in which it allows the stubs 3a to remove the takeup reel 2 from the opened cassette 1 and to move such reel toward the position 2' of FIG. 1. Any such part or parts of the casing of the cassette 1 which adhere to the reel 2 on the stubs 3a are separated from the reel by the stop 107 which is adjacent to the path 2b of movement of reels 2 toward the position 2'. The spring 7 in the sheath 5a expands as soon as the lower part of the shell of the casing is removed from the reel 2 so that the tip of the tool 5 can bear against the outermost convolution of the backing strip B on the core of the reel which is being moved toward the position 2'. Such direct engagement between the backing strip B and tool 5 insures that the orientation of the reel 2 with respect to the lever 3 remains unchanged during movement of the lever toward the solid-line position of FIG. 1. This is important and desirable because, if the reel 2 is held against rotation on the stubs 3a, the front portion BB of the backing strip B invariably assumes a predetermined optimum position or orientation when the reel 2 reaches the position 2'. Such optimum position is that position in which the front portion BB of the backing strip B is not located between the friction wheel 9 and the tip of the tool 5, as considered counter to the direction indicated by the arrow 23.

The front portion BB of the backing strip B is automatically engaged by the constantly driven friction wheel 9 as soon as the reel 2 reaches the position 2' of FIG. 1. The tip of the tool 5 continues to bear against the outermost convolution of the backing strip B so that it holds the reel 2 (in the position 2') against counterclockwise rotation in response to clockwise rotation of the friction wheel 9. The tool 5 engages the abutment 8 on the lever 3 so that it remains in the solid-line position of FIG. 1. The friction wheel 9 engages the front portion BB of the backing strip B and loops the front portion in a manner as shown in FIG. 1 so that the front portion is doubled over itself while moving toward the nip of the advancing rolls 16 and 17. The rolls 16, 17 thereupon form in the front portion BB a crease and entrain the backing strip B in the direction indicated by arrow 123. The friction wheel 9 engages the outermost convolution of the backing strip B on the core of the reel 2 (in the position 2') but cannot rotate the reel because it cannot overcome the resistance of the tool 5 which bears against such outermost convolution under the action of the spring 7. It is clear that a friction clutch or the like can be provided between the friction wheel 9 and the flexible shaft 115 to allow the friction wheel to come to a halt as soon as it has looped the front portion BB so that it engages the outermost convolution of the backing strip B on the core of the reel 2 in the position 2'. It is also possible to construct the flexible drive shaft 115 in such a way that it undergoes a deformation (for example, twisting) as soon as the friction wheel 9 engages that portion of the backing strip B which cannot be displaced owing to the action of tool 5 and spring 7.

As the advancing rolls 16, 17 begin to move the backing strip B in the direction indicated by arrow 123, the backing strip begins to move at a considerable speed whereby its tension increases to an extent which is necessary to pivot the tool 5 in the direction indicated by arrow 6 so that the tip of the tool moves away from the core of the reel 2 in the position 2' and allows the reel to rotate in response to withdrawal of the backing strip (arrow 23). The outermost convolution of the backing strip B on the core of the reel 2 in the position 2' then tends to rotate the friction wheel 9 counter to the direction indicated by the arrow 15 whereby the wheel 9 pivots with the carrier 10 and causes the torsion spring 12 to snap over to the position of FIG. 2 in which the friction wheel 9 is disengaged from the reel 2 because the carrier 10 abuts against the post 14. The wheel 9 then ceases to oppose rotation of the reel 12 in the direction indicated by arrow 23.

The leader FF of the film F emerges in response to withdrawal of a certain length of the backing strip B. As a rule, the tendency of the film F to curl causes the leader FF to abut against the adjacent outer side of the backing strip B so that the leader moves against and is intercepted by the deflector 19 to enter the channel CH and to advance toward the nip of the rolls 20, 21. The rolls 20, 21 engage and entrain the film F so that the latter is withdrawn at the speed of the backing strip B and moves its leader FF into the range of the aforementioned splicing device. The rotary parts may be arrested for a certain interval of time when the leader FF of film F reaches the splicing device, especially if the splicing device is of the type which can attach the leader of a fresh film to the trailing end of the preceding film only while the two films are held against movement with respect to the splicing station.

Once the withdrawal of film F and backing strip B is completed, the lever 3 is returned to the broken-line position of FIG. 1 and its stubs 3a are retracted during such movement by suitable cams or magnets to release the spent reel 2 which descends into a receptacle or onto a conveyor. The stubs 3a return to their extended positions when the lever 3 returns to the broken-line position of FIG. 1 so that they enter the openings 2a of a fresh takeup reel 2.

A connecting member 24 couples the lever 3 with the carrier 10 so that the latter returns the friction wheel 9 to the operative position in response to movement of the lever 3 to the broken-line position of FIG. 1. The lever 3 has a pin 25 which extends into an elongated slot 24a of the connecting member 24. The inclined face 5d of the tool 5 strikes against the stop 107 and is temporarily depressed into the sheath 5a while the lever 3 pivots clockwise to reassume the broken-line position of FIG. 1.

If desired, the reel 2 can be held against rotation in a counterclockwise direction by a blocking means other than the tool 5. For example, the stubs 3a of the withdrawing lever 3 can be provided with one-way clutches in the form of ratchets and pawls or sprags which allow the reel 2 to rotate clockwise (arrow 23) but prevent the reel from rotating in the opposite direction. In such embodiment, the friction wheel 9 can remove several convolutions of the strip B to form the front portion which enters into and is entrained through the nip of the advancing rolls 16, 17. However, it is then necessary to provide guide means which partially surrounds a reel in the position 2' to prevent the formation of a loop of backing strip at a wrong point, i.e., at a location from which the loop could not reach the nip of the rolls 16, 17.

An advantage of the improved apparatus is that the front portion of the backing strip B need not be monitored by a photoelectric detector or the like, that the backing strip and the film are withdrawn in different directions, and that the majority of moving parts, such as the tool 5 and the friction wheel 9, can be moved from engagement with a reel in the position 2' by the backing strip rather than by devices which are responsive to signals furnished by detectors or the like. Moreover, the friction wheel 9 can automatically return to its operative position not later than when the supporting lever 3 reaches the broken-line position of FIG. 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for intercepting the leader of photographic film which is convoluted on a reel within a convoluted backing strip having a front portion extending beyond the leader, comprising means for supporting a reel with convoluted film and backing strip thereon; drive means movable into engagement with the front portion of the backing strip on the reel in said supporting means to thereby loop the front portion of the backing strip; means for blocking rotation of the reel at least during engagement between the front portion of the backing strip and said drive means; means for advancing the looped front portion of the backing strip along a first path and for thereby rotating the reel in said supporting means in a direction to pay out the backing strip and the film whereby the leader of the film becomes exposed in response to rotation of the reel in said direction; and guide means for directing the leader of the film into a second path.

2. Apparatus as defined in claim 1, wherein said drive means comprises a rotary friction wheel and said advancing means comprises a pair of rolls, the looped front portion of the backing strip being arranged to enter the nip of and to be entrained by said rolls in response to frictional engagement between said front portion and said wheel.

3. Apparatus as defined in claim 1, wherein said blocking means includes means for holding the reel in said supporting means against rotation at least in a direction to collect the film and the backing strip.

4. Apparatus as defined in claim 1, wherein said guide means defines a channel for the leader of the film and includes a deflector bearing against the outermost convolution of the backing strip while the reel in said supporing means is rotated by said advancing means through the medium of the backing strip.

5. Apparatus as defined in claim 4, wherein said deflector is elastic and said supporting means includes means for rotatably supporting the reel.

6. Apparatus as defined in claim 1, wherein said drive means comprises a friction wheel, a movable carrier rotatably supporting said wheel, and means for rotating said wheel in such direction that said wheel tends to rotate said reel in a direction to collect the film and the backing strip while said wheel engages the outermost convolution of the backing strip on the reel in said supporting means.

7. Apparatus as defined in claim 6, wherein said means for rotating said wheel includes a flexible shaft.

8. Apparatus as defined in claim 6, wherein said carrier is movable between first and second positions in which said wheel respectively engages and is disengaged from the outermost convolution of the backing strip on the reel in said supporting means, and further comprising means for biasing said carrier to at least one of said positions.

9. Apparatus as defined in claim 8, wherein said carrier is pivotable between said positions and is pivoted to said second position by said wheel in response to rotation of said reel in said direction while said wheel engages the outermost convolution of the backing strip.

10. Apparatus as defined in claim 8, wherein said biasing means comprises a spring which opposes movement of said carrier from either of said positions.

11. Apparatus as defined in claim 1, wherein said blocking means comprises at least one one-way clutch which permits the reel in said supporting means to rotate in said direction.

12. Apparatus as defined in claim 1, wherein said blocking means is movable into and from engagement with the outermost convolution of the backing strip on the reel in said supporting means.

13. Apparatus as defined in claim 12, wherein said blocking means is arranged to move away from the backing strip in response to entrainment of the front portion of the backing strip by said advancing means and the resulting rotation of the reel in said direction.

14. Apparatus as defined in claim 13, wherein said supporting means includes a member which is movable between first and second positions in one of which said member engages a reel in the breakable casing of a cassette and in the other of which said member maintains the thus engaged reel in contact with said drive means, said blocking means including a tool which is movable with said member to break open the casing of the cassette during movement of said member from said one to said other position.

15. Apparatus as defined in claim 14, wherein said member is a lever which is pivotable between said positions and said tool includes a portion which breaks the casing in response to movement of said lever from said one position and engages the outermost convolution of the backing strip on the reel on said lever in said other position of said lever.

* * * * *